(12) United States Patent
De Filippis

(10) Patent No.: US 8,896,170 B2
(45) Date of Patent: Nov. 25, 2014

(54) ELECTRIC MACHINE AND METHOD FOR MANUFACTURING IT

(75) Inventor: Pietro De Filippis, Varazze (IT)

(73) Assignee: SPAL Automotive S.r.l. (IT)

( * ) Notice: Subject to any disclaimer, the term of this patent is extended or adjusted under 35 U.S.C. 154(b) by 383 days.

(21) Appl. No.: 13/322,179

(22) PCT Filed: May 25, 2010

(86) PCT No.: PCT/IB2010/052311
§ 371 (c)(1),
(2), (4) Date: Jan. 24, 2012

(87) PCT Pub. No.: WO2010/136966
PCT Pub. Date: Dec. 2, 2010

(65) Prior Publication Data
US 2012/0112584 A1    May 10, 2012

(30) Foreign Application Priority Data
May 25, 2009   (IT) .............................. BO2009A0336

(51) Int. Cl.
*H02K 11/00*  (2006.01)
*H02K 3/52*   (2006.01)
*H02K 15/00*  (2006.01)
*H02K 3/00*   (2006.01)

(52) U.S. Cl.
CPC ........ *H02K 15/0075* (2013.01); *H02K 11/0073* (2013.01); *H02K 3/522* (2013.01); *H02K 2203/06* (2013.01)
USPC ........... 310/71; 310/179; 310/180; 310/254.1

(58) Field of Classification Search
CPC .............. H02K 3/522; H02K 15/0075; H02K 11/0073; H02K 2203/06
USPC .................................. 310/71, 179–180, 254.1
See application file for complete search history.

(56) References Cited

U.S. PATENT DOCUMENTS 2,690,773 A   10/1954  Weiser et al.
4,642,497 A *  2/1987  Boyd, Jr. ..................... 310/68 R
(Continued)

FOREIGN PATENT DOCUMENTS

EP       1376825      1/2004
GB       913352       12/1962
(Continued)

OTHER PUBLICATIONS

International Search Report and Written Opinion dated Mar. 3, 2011.
(Continued)

*Primary Examiner* — Thanh Lam
(74) *Attorney, Agent, or Firm* — Timothy J. Klima; Shuttleworth & Ingersoll, PLC

(57) ABSTRACT

A method for making a rotary electric machine comprises the steps of: preparing a core (18) having a plurality of pole expansions and a plurality of windings (100, 200, 300) made of electrically conductive material on the pole expansions, where at least a part of the windings (100, 200, 300) is made from a conductor wire having a free end (14) that can be connected electrically to a mains power supply; stably coupling to each other at least two free ends (14) of different windings (100, 200, 300) so as to connect them to a single power supply terminal; twisting the coupled ends (14) together to form a single electrical termination (5, 6, 7) twisted along a principal line of extension of the electrical termination (5, 6, 7).

6 Claims, 13 Drawing Sheets

(56) References Cited

U.S. PATENT DOCUMENTS

| | | | |
|---|---|---|---|
| 4,698,533 A * | 10/1987 | Kindig et al. | 310/71 |
| 4,902,923 A * | 2/1990 | Okauchi | 310/268 |
| 5,613,529 A | 3/1997 | Tanaka et al. | |
| 6,141,864 A | 11/2000 | Bugosh | |
| 6,628,023 B1 * | 9/2003 | Paquet | 310/71 |
| 6,856,056 B2 * | 2/2005 | Lyle et al. | 310/71 |
| 7,977,840 B2 * | 7/2011 | Chu et al. | 310/179 |
| 8,080,910 B2 * | 12/2011 | Tsukamoto et al. | 310/71 |
| 8,269,386 B2 * | 9/2012 | Kaiser et al. | 310/71 |
| 8,614,530 B2 * | 12/2013 | Chamberlin et al. | 310/180 |
| 2009/0026854 A1 | 1/2009 | An et al. | |

FOREIGN PATENT DOCUMENTS

| | | |
|---|---|---|
| JP | 08-205487 | 8/1996 |
| JP | 10-285894 | 10/1998 |
| JP | 2002218680 | 6/2002 |
| JP | 2002-354762 | 12/2002 |
| JP | 2004046864 | 2/2004 |
| JP | 2006081375 | 3/2006 |
| WO | 2008/055636 | 5/2008 |

OTHER PUBLICATIONS

Japanese Office Action dated Jul. 15, 2014 from counterpart Japanese application No. 2012-511405.

* cited by examiner

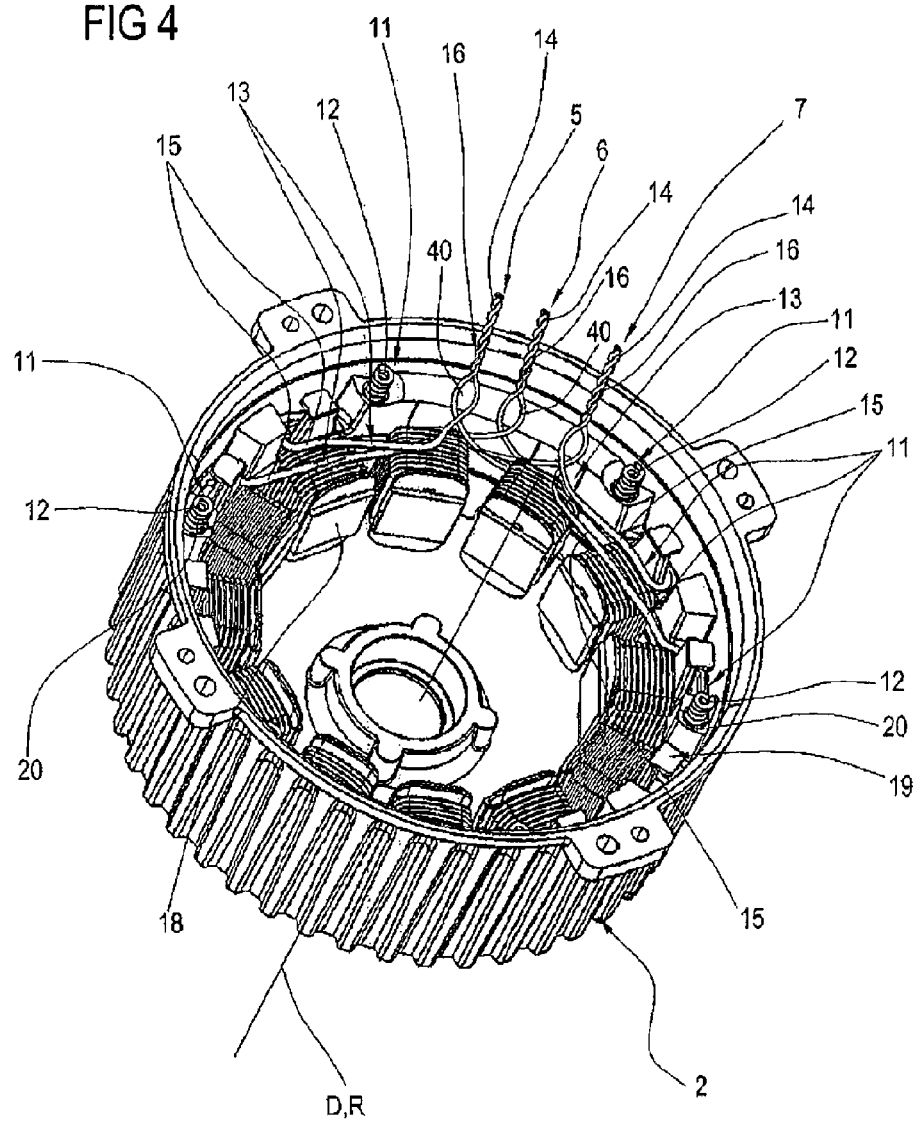

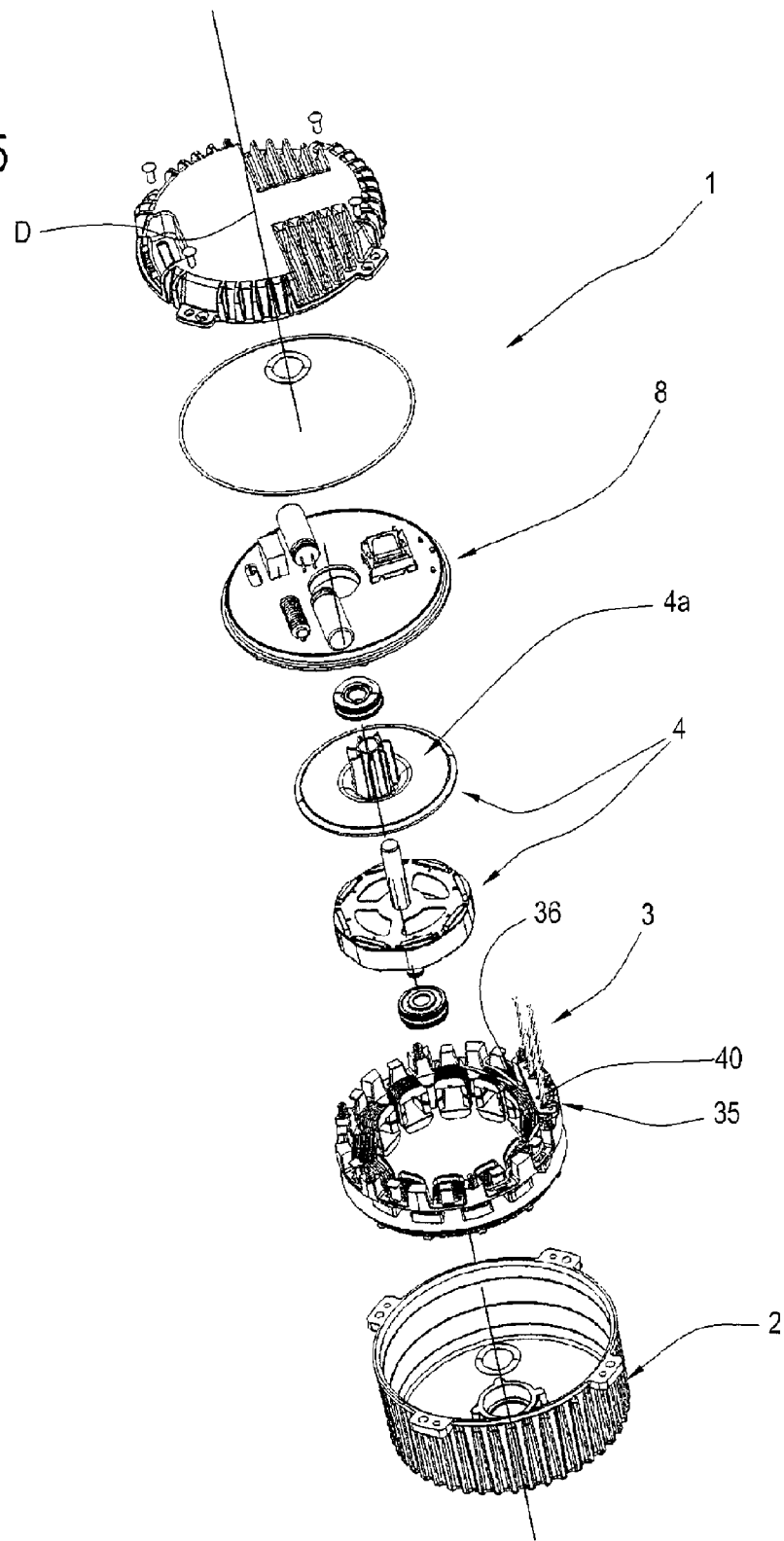

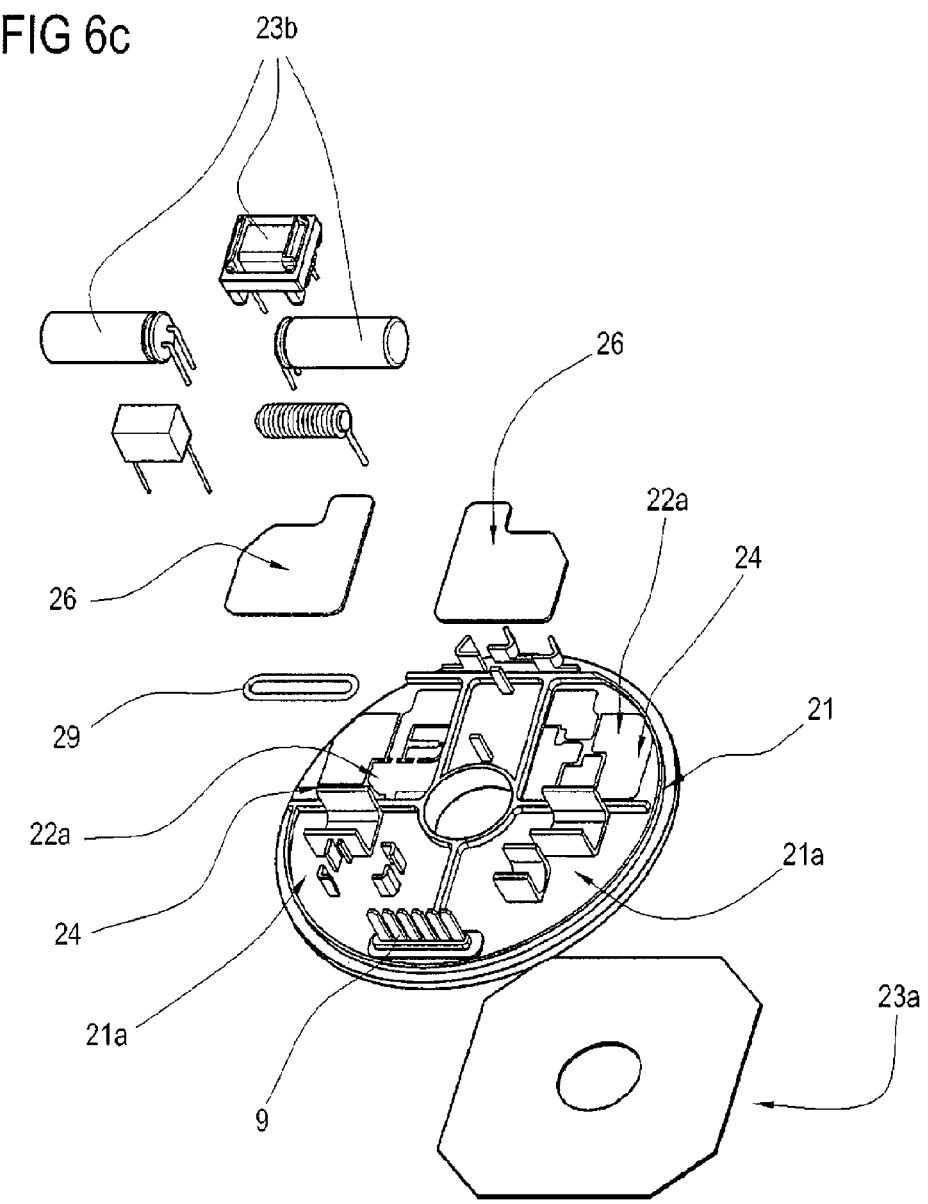

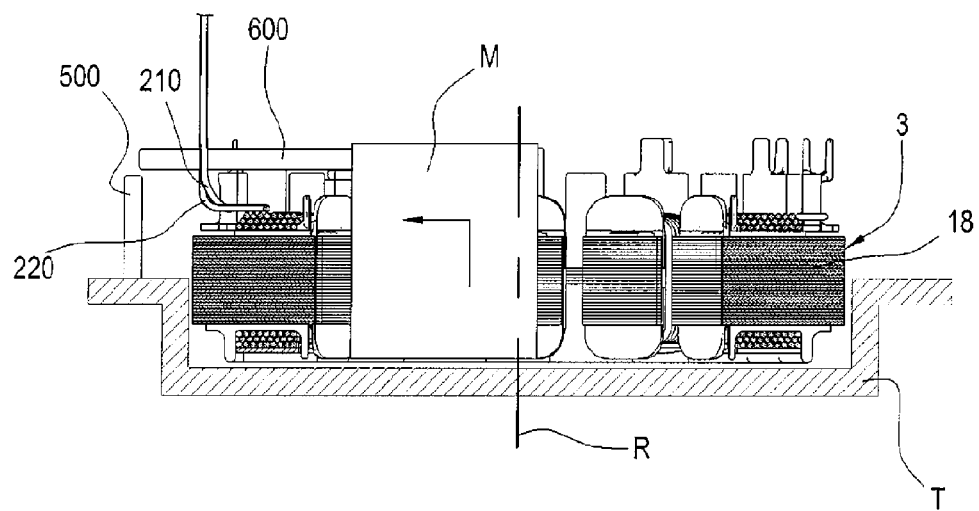
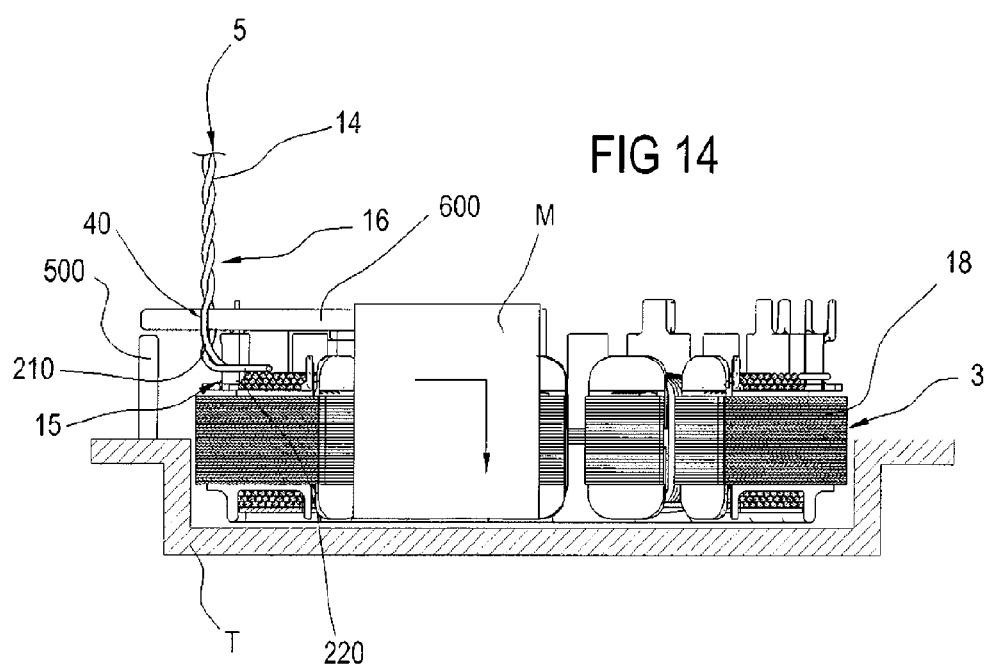

ELECTRIC MACHINE AND METHOD FOR MANUFACTURING IT

This application is the National Phase of International Application PCT/IB2010/052311 filed May 25, 2010 which designated the U.S. and that International Application was published under PCT Article 21(2) in English.

This application claims priority to Italian Patent Application No. BO2009A000336 filed May 25, 2009 and PCT Application No. PCT/IB2010/052311 filed May 25, 2010, which applications are incorporated by reference herein.

TECHNICAL FIELD

This invention relates to a stator for an electric motor and to a method for making the electric windings of the motor, the stator being preferably intended for use in an electric machine of the type having the electronic control circuitry built into it. More specifically, this invention relates to a method for making the stator of an electric motor.

BACKGROUND ART

A rotary electric machine basically comprises a casing, a stator rigidly connected to the casing, a rotor, for example of the type with permanent magnets, enclosed by the casing and rotatably connected to the latter.

When the electric machine functions as a motor, the rotor is rotationally driven by powering the stator through an electronic circuit or control circuitry, which in this case, is also positioned inside the casing.

The casing is then closed by a cover with a terminal strip on the outside of it to power the electronic circuitry and, hence, the electric motor. The electronic drive circuitry, which is mounted on a respective plate, is interposed between the stator and the cover.

The control circuitry comprises a power circuit and must therefore be provided with a heat sink for absorbing the heat produced by the electronic power components during operation.

At the same time, the assembly must guarantee an efficient electrical connection between the electronic circuit and the electric motor so as to ensure that the motor operates correctly.

In the case of electric motors with built-in electronic circuitry, absorption of excess heat is not easy to achieve because it is difficult to make an effective electrical connection between the electronic circuitry and the motor and good thermal contact between the electronic circuitry and a corresponding heat sink, in particular the cover.

The main problems are due precisely to the fact that, because the casing has to be closed with the cover, it is difficult, with the motor substantially closed, to make all the electrical and mechanical connections in optimum manner.

To enable the assembly to be closed, prior art solutions provide at least one sliding contact, such as a connector, for example, which is easily subject to problems of reliability and efficiency for example on account of vibrations, contact wear, or operating temperature, between the motor and the electronic circuitry or between the electronic circuitry and the terminal strip.

In the first case, the electronic circuitry is rigidly connected to the cover in order to optimize heat exchange with the latter and, when the casing is closed, a sliding contact connects the electronic circuitry to the motor. In this case, therefore, the heat sink function takes priority over the reliability of the connection between the electronic circuitry and the motor.

In the second case, the electronic circuitry is effectively and rigidly connected to the motor, for example by soldering, whilst the contact of the circuitry with the cover is not particularly effective in terms of heat exchange on account of the necessary closing tolerances.

Thus, in the latter solution, the electronic circuitry is not effectively pressed against the heat sink, for example on account of assembly tolerances. Also, as already mentioned, there is normally a sliding contact, with all its inherent limitations, between the electronic circuitry and the terminal strip on the outside.

DISCLOSURE OF THE INVENTION

In this context, the main purpose of the invention is to propose a stator for an electric motor, in particular an electric motor with electronic circuitry built into the casing, and a method for making the stator, which are free of the above mentioned disadvantages.

This invention has for an aim to propose a method for making an electric machine that is more reliable than prior art solutions in terms of excess heat absorption and electrical connections inside it.

Another aim of the invention is to propose a stator, in particular for an electric motor with built-in electronic circuitry where the excess heat produced by the circuitry itself is effectively absorbed.

A further aim of the invention is to propose a stator for an electric machine with a reliable electrical connection between the electric motor and the electronic power circuitry.

A yet further aim of the invention is to propose an electric machine having an effective interconnection between the terminal strip and the motor.

The above mentioned purpose and aims are substantially achieved by a stator for an electrical machine having the features described in the independent claim 1 and in one or more of the claims dependent thereon.

BRIEF DESCRIPTION OF THE DRAWINGS

Further features and advantages of the present invention are more apparent in the detailed description below, with reference to a preferred, but non-exclusive embodiment of a method for making an electrical machine, as illustrated in the accompanying drawings, in which:

FIG. 4 is another perspective view of the electric machine of FIG. 1, with some parts cut away in order to better illustrate others;

FIG. 5 is a schematic exploded view, with some parts cut away for greater clarity, of the electric machine of FIG. 1;

FIG. 6c illustrates the detail of FIGS. 6a and 6b in a schematic perspective view with some parts cut away for greater clarity;

FIG. 10b illustrates the stator of FIG. 10a in a cross section through the line X-X of FIG. 10a;

FIG. 11b illustrates the stator of FIG. 11a in a cross section through the line XI-XI of FIG. 11a;

FIG. 12b illustrates the stator of FIG. 12a in a cross section through the line XII-XII of FIG. 12a;

FIGS. 13 and 14 illustrate the stator of FIG. 9a in two cross sections showing two final consecutive steps in its production.

DETAILED DESCRIPTION OF THE PREFERRED EMBODIMENTS OF THE INVENTION

Figure 1:
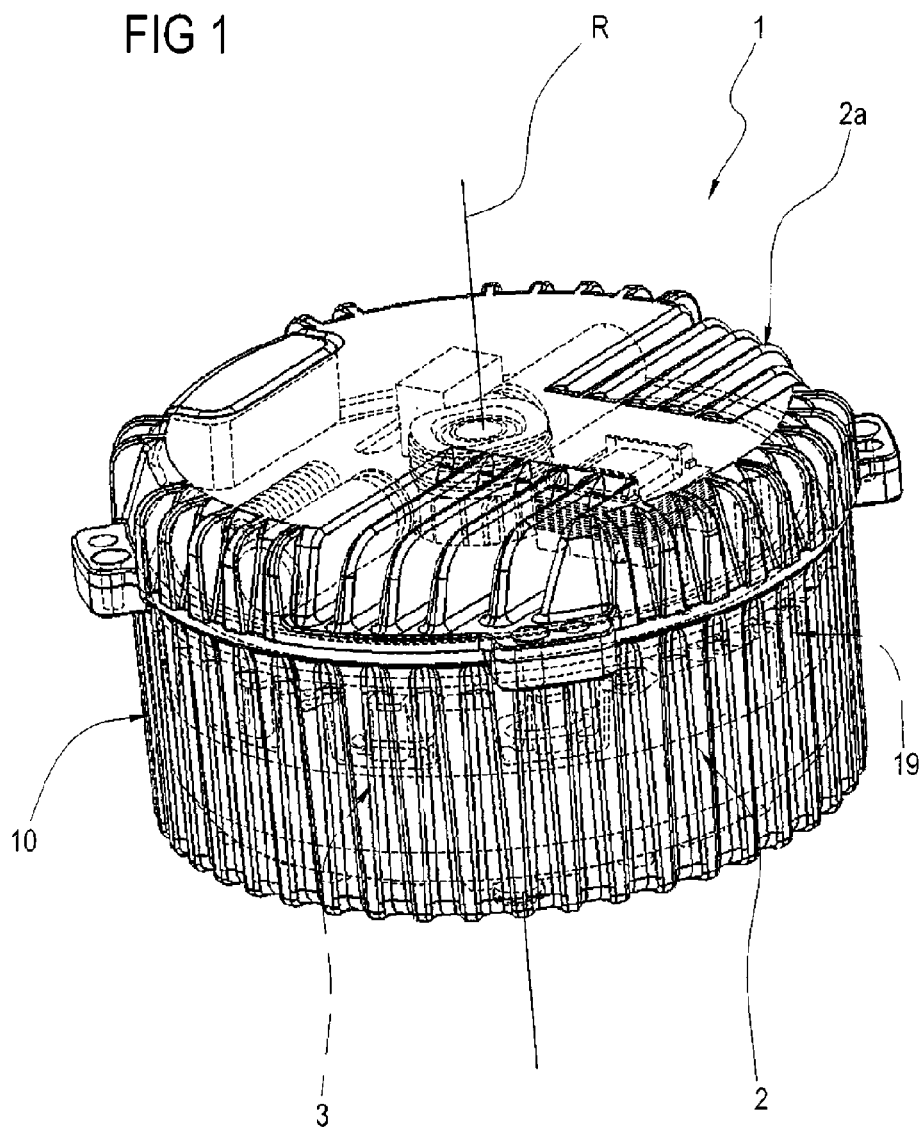
FIG. 1 is a schematic perspective view of a rotary electric machine comprising a stator according to this invention.

With reference to the accompanying drawings and in particular with reference to FIGS. 1 and 5, the numeral 1 denotes an electric machine made using the method according to this invention.

The machine 1 comprises an electric motor of the sealed type, that is to say without any opening giving access to the inside of it, to which this specification expressly refers but without limiting the scope of the invention.

The machine 1 comprises a casing 2 and a respective cover 2a which together form a sealed enclosure 10, a stator or stator unit 3 housed in the casing; and a rotor or rotor unit 4, housed in the casing 2 and rotatably connected to the latter.

Figure 2:
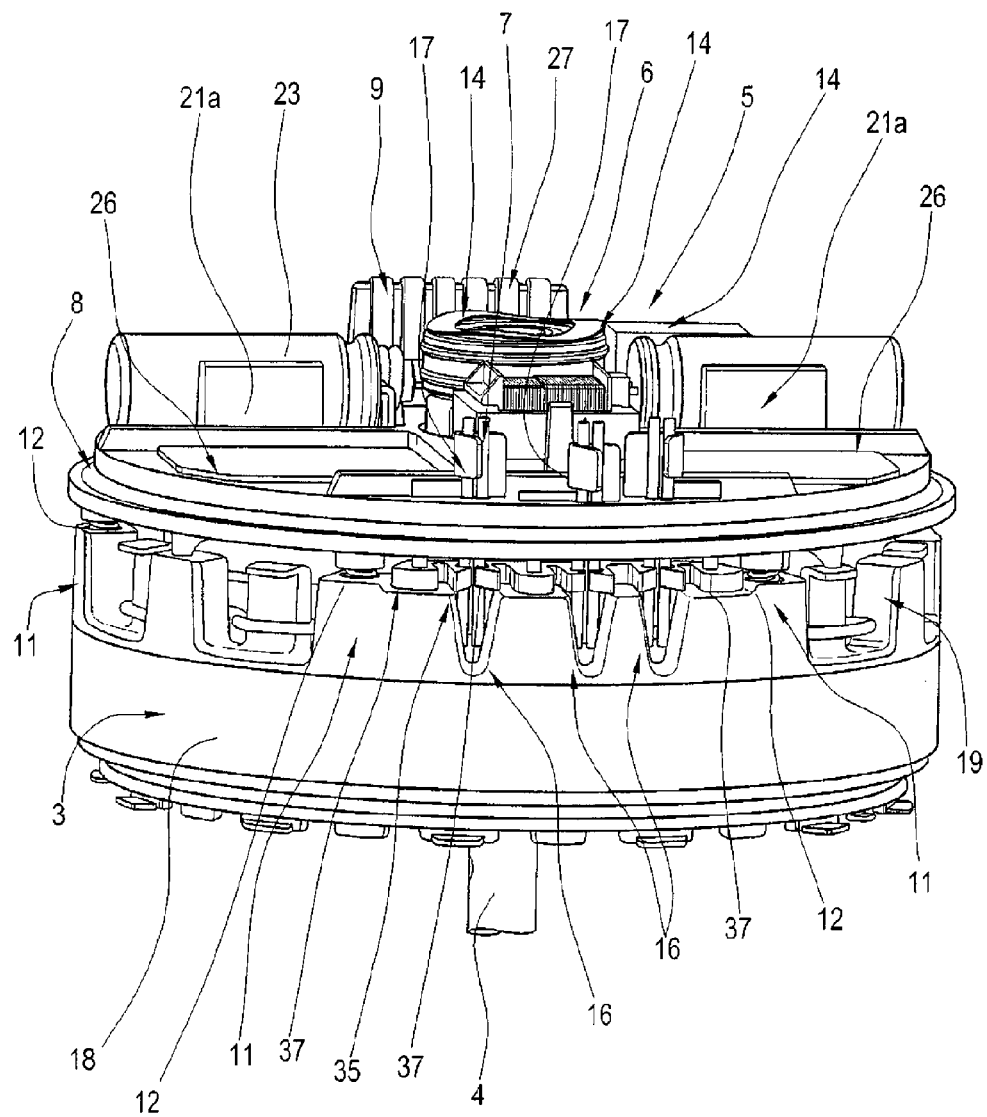
FIG. 2 is a schematic perspective view, with some parts cut away in order to better illustrate others, of the rotary electric machine of FIG. 1.

With reference in particular to FIGS. 2 and 4, the stator 3, in the example illustrated, has three electric terminations 5, 6, 7 and the machine 1 comprises an electronic circuit 8 for powering the electric terminations 5, 6, 7. More in detail, the machine illustrated in particular in FIGS. 9a and 9b comprises twelve pole expansions, on four of which are wound first windings 100 electrically connected in series with each other and electrically powered by the first electric termination 5, while on another four of which are wound second windings 200 also electrically connected in series with each other and electrically powered by the second electric termination 6, the last four pole expansions having wound on them third windings 300, also electrically connected in series with each other and electrically powered by the third electric termination 7.

The circuit 8 is advantageously housed in the casing 2 and a terminal strip 9 for powering the circuit 8 is accessible from outside the enclosure 10.

The machine 1 also comprises a heat sink for absorbing the heat produced, in particular, by the electronic circuit 8.

In this solution, the heat sink is embodied by the cover 2a which, as will become clearer as this description continues, is kept in thermal contact with the electronic circuit 8.

With reference in particular to FIG. 4, it may be observed that the machine 1 comprises elastic coupling or connecting means 11 operating between the stator 3 and the electronic circuit 8.

When the motor is closed, these connecting means 11 between the electronic circuit 8 and the stator 3 enable the electronic circuit 8 not only to move closer to the stator 3, to which it is preferably connected rigidly and securely, as described in more detail below, but also to be pressed against the cover 2a.

As illustrated, the connecting means 11 comprise a plurality of elastic pushing elements 12 or, more specifically, springs which, when the machine is assembled, push the electronic circuit 8 towards the heat sink, away from the stator 3.

The elastic connecting means 11 also comprise a flexible portion 13 of the electric terminations 5, 6, 7.

In other words, each of the electric terminations 5, 6, 7 has at least one flexible portion 13, in particular, towards the stator 3, forming part of the elastic connecting means 11 in order to maintain a sure connection between the electronic circuit 8 and the electric terminations 5, 6 and 7 while the circuit itself is being pressed against the cover 2a.

The electronic circuit 8 is, in particular, rigidly associated with the electric terminations 5, 6, 7 at one end 14 of the respective flexible portion 13.

Looking more closely at the details in connection with the flexible portions 13, where the reference character R denotes the axis of rotation of the motor, substantially parallel to a coupling direction D along which the motor is assembled, said flexible portions have a first leg 15 substantially transversal to the direction D (FIG. 4).

The leg 15 defines a sort of leaf-spring suspension system which allows the flexible portion 13 to move.

The electronic circuit 8 is therefore movable relative to the stator 3 towards and away from the latter according to the extension of the leaf springs, that is to say, the leaf springs undergo flexural deformation such as to allow the flexible portions 13 of the electric terminations 5, 6, 7 to damp the movements of the electronic circuit 8 towards and away from the stator 3.

In practice, each electric termination 5, 6, 7, which, in the example illustrated, takes the form of two wires placed side by side, projects from a last winding 100, 200, 300 towards a point substantially where it is fixed to the electronic circuit 8.

Each flexible portion 13 also has a second leg 16 substantially parallel to the coupling direction D and extending towards the electronic circuit 8.

As illustrated in FIG. 2, the end 14 of the flexible portion 13 is defined by one end of the leg 16.

Each electric termination 5, 6, 7 is connected to the electronic circuit 8 at a respective tab 17 suitably provided in the electronic circuit 8 itself. The ends 14 are soldered to the respective tabs 17.

The numeral 35 in FIGS. 2, 5 and 8 denotes in their entirety means for keeping the ends 14 in a position suitable for assembly, as explained in more detail below.

With reference to FIGS. 2 and 5, these means 35 comprise a plate-like element 36 having a plurality of seats 37 in which the flexible portions 13, in particular their second legs 16, are engaged.

The machine 1 comprises means 38 for coupling the element 36 to the stator 3 in such a way as to hold them substantially in place during assembly of the machine 1.

Figure 8:
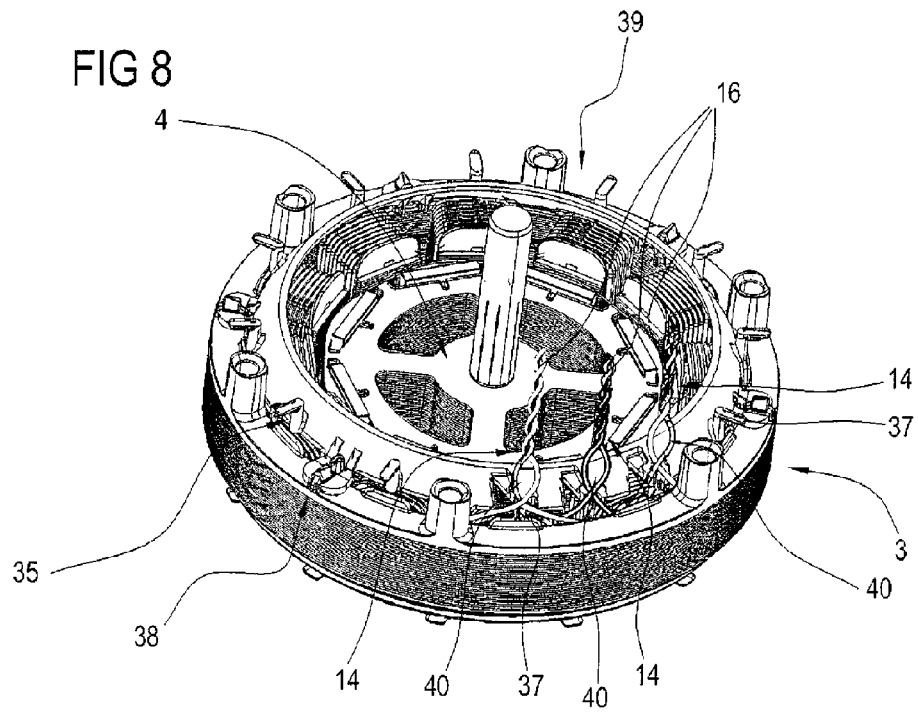
FIG. 8 illustrates the stator of the electric machine of FIG. 1 in a schematic perspective view and according to an alternative embodiment.

With reference to FIG. 8, the means 35 for keeping the ends 14 in a position suitable for assembly are embodied by a diffuser element 39 provided with seats 37 similar to those mentioned above.

The diffuser element 39 is substantially circular in section and has the shape of a truncated cone, with curved lateral surfaces.

The diffuser element 39 is housed in the casing 2, not shown in FIG. 8, and is connected to the stator 3 by the above mentioned coupling means 38.

It should be noticed that in this embodiment the element 39 is shaped in such a way as to keep the warm air which is produced inside the casing 2 and which is moved by the rotor 4, in particular by a fan 4a, into a zone inside the element 39 itself so as not to affect the electronic control circuit 8, or more specifically, a power circuit 22 forming part of the circuit 8 and described in more detail below.

In an alternative embodiment, the means 35 are embodied by the legs 16 themselves.

In this embodiment, the legs 16 are themselves provided with a rigid structure that keeps them effectively in a position substantially parallel to the axis D.

Advantageously, the two conductor wires forming each electric termination 5, 6, 7 are twisted round each other so the electric terminations 5, 6, 7 are sufficiently rigid to remain still during assembly of the motor 1. This has important advantages, which are described below.

As regards the elastic elements 12, it should be noticed that the stator 3, which comprises a metal core or portion 18 with pole expansions, coated with an isolating portion 19, has a plurality of seats 20 for the elastic elements 12.

The seats 20 are formed in the isolating portion 19 and are preferably conical to facilitate insertion of the elastic elements 12.

In order to hold the elastic elements 12 in the correct position, thus keeping the circuit 8 pressed against the cover 2a, even under difficult working conditions which cause heating of the machine 1, the seats 20 are tubular, that is to say, they are open at one end in such a way that the elastic elements 12 rest on the metal portion 18.

Figure 6A:
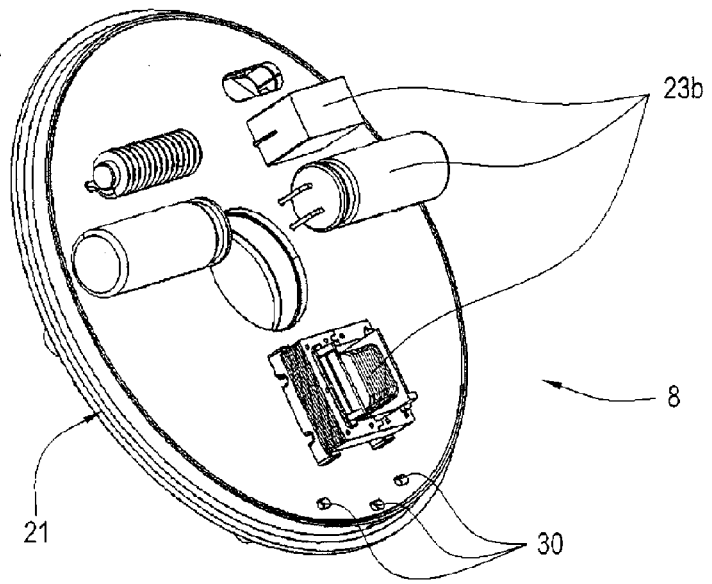
FIG. 6a is a schematic perspective view of a first detail of the electric machine of FIG. 1.
Figure 6B:
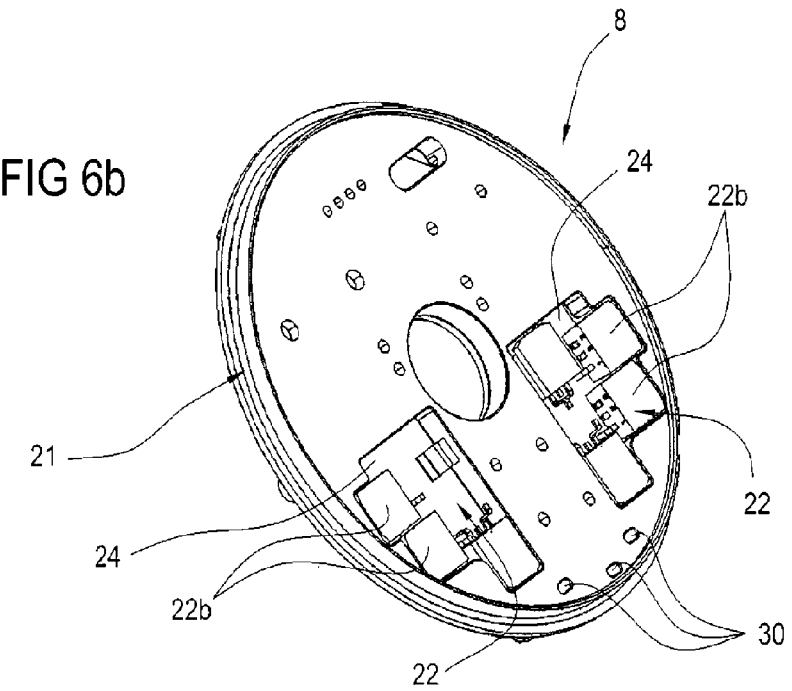
FIG. 6b illustrates the detail of FIG. 6a in another schematic perspective view.

FIGS. 6a, 6b and 6c in particular show how the electronic circuit 8 is mounted on a substantially disc-shaped mounting element 21 and the elastic pushing elements 12 operate between the stator 3 and the element 21.

The mounting element 21 has suitable mechanical properties to apply the pushing action against the cover 2a.

It should be noticed that the electronic circuit 8 comprises the power circuit 22, which produces most of the heat to be absorbed, and a signal circuit 23.

The power circuit 22 comprises conductive tracks 22a, for example of copper, on which are mounted substantially known electronic power components 22b, such as MOSFETs, for example, necessary for operation of the motor 1.

The signal circuit 23 comprises a multilayer printed circuit board 23a and a plurality of related passive electronic filtering and/or signal components 23b mounted on the circuit board 23a itself.

Preferably, the electronic power components 22b are mounted on the side opposite the passive electronic components 23b with respect to the mounting element 21.

In the preferred embodiment, the electronic power components 22b are mounted on the side opposite the cover 2a with respect to the mounting element 21.

Preferably, the electronic power components 22b are mounted directly on the mounting element 21.

It should be noticed that the mounting element 21 also comprises a plurality of elements 21a for individually fastening the passive electronic components 23b in such a way as to hold them firmly in place.

It is important to notice that this solution prevents high currents from flowing on a printed circuit that might be damaged or deteriorated by this type of current flow.

As illustrated in particular in FIG. 6c, the power circuit 22, in particular the tracks 22a, is accessible through the mounting element 21 in such a way that it can be placed in contact with the heat sink.

In practice, in the vicinity of the power circuit 22, the mounting element 21 has a pair of windows 24 giving access to the conductive tracks 22a of the circuit 22 itself.

Figure 7:
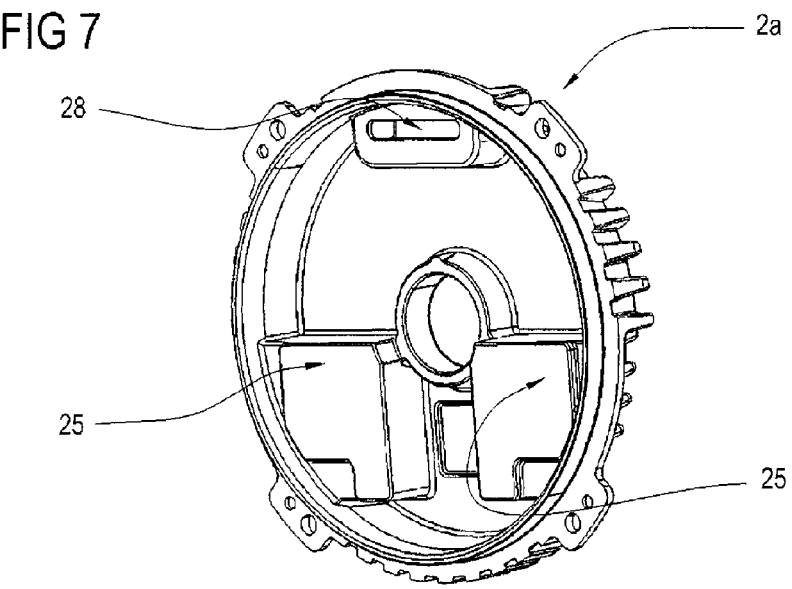
FIG. 7 is a schematic perspective view of a second detail of the electric machine of FIG. 1.

As may be observed with reference in particular to FIG. 7, the cover 2a, which, as mentioned above, is a heat sink for the electronic circuit 8, has on the inside of it a pair of protuberances 25 located substantially at the windows 24 in such a way that it can come into contact with the power circuit 22, that is, with the conductive tracks 22a.

Advantageously, between the conductive tracks 22a of the power circuit 22 and the respective protuberance 25, the machine 1 comprises a thermally conductive, electrically insulating element 26, for example made of silpad®.

It should be noticed that to enable the element 26 to function correctly, the elastic elements 12 are suitably dimensioned to press the power circuit 22 against the heat sink with a predetermined pressure.

For example, if silpad® is used, the pressure required for correct operation is at least 1.5 kg per square centimetre.

The elastic elements 12 are designed and distributed to optimize the pushing force applied to the mounting element 21.

In particular, the elastic elements 12 are designed to apply the pushing force at the components of the power circuit 22 but without making the structure hyperstatic.

In the embodiment illustrated, the elastic elements 12 are divided into two sets of three, the elements in each set of three being spaced at angular intervals of 120°. In the preferred embodiment, the elastic elements 12 apply a pushing force of approximately 60 kg. In the light of the above, when the cover is placed on the casing, the elastic elements 12 push the electronic circuit 8 against the cover 2a hard enough to guarantee good heat exchange, while the portions 13 allow an optimum connection to be maintained between the electronic circuit 8 itself and the stator windings.

Figure 3:
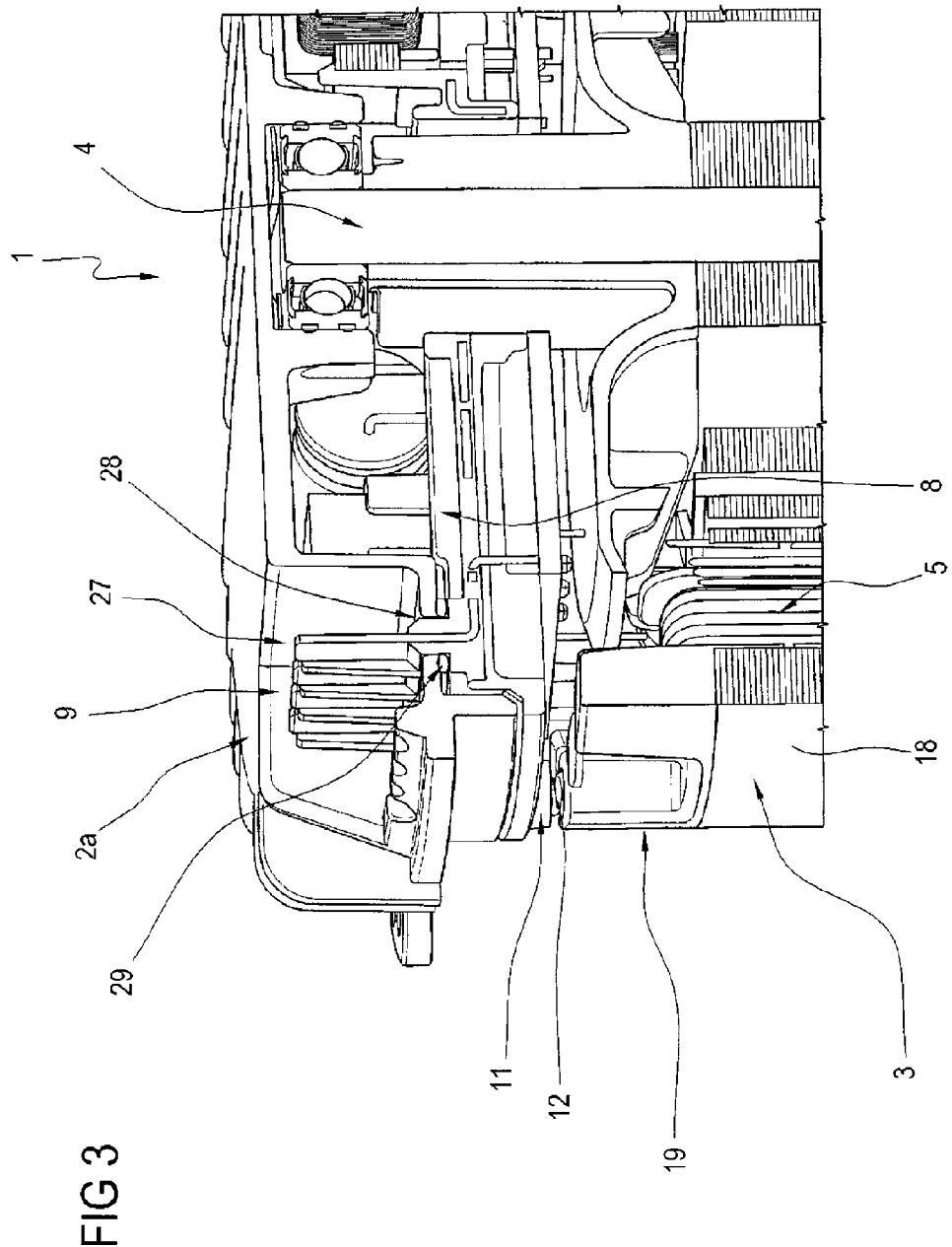
FIG. 3 is a schematic section view of the machine of FIG. 1, with some parts cut away in order to better illustrate others.

With reference to FIGS. 3 and 7, for powering the machine 1, the invention contemplates the provision of a terminal strip 27 protruding from the cover 2a through a suitable opening 28.

Preferably, at the opening 28, between the terminal strip 27 and the cover 2a, there is an interposed gasket 29 that is pressed against the cover 2a by the elastic elements 12, thus guaranteeing an effective seal at the terminal strip 27 when the machine 1 is closed.

Below is detailed description of the method for making the stator 3, explaining in particular how the electric terminations 5, 6, 7 are made.

Figure 9A:
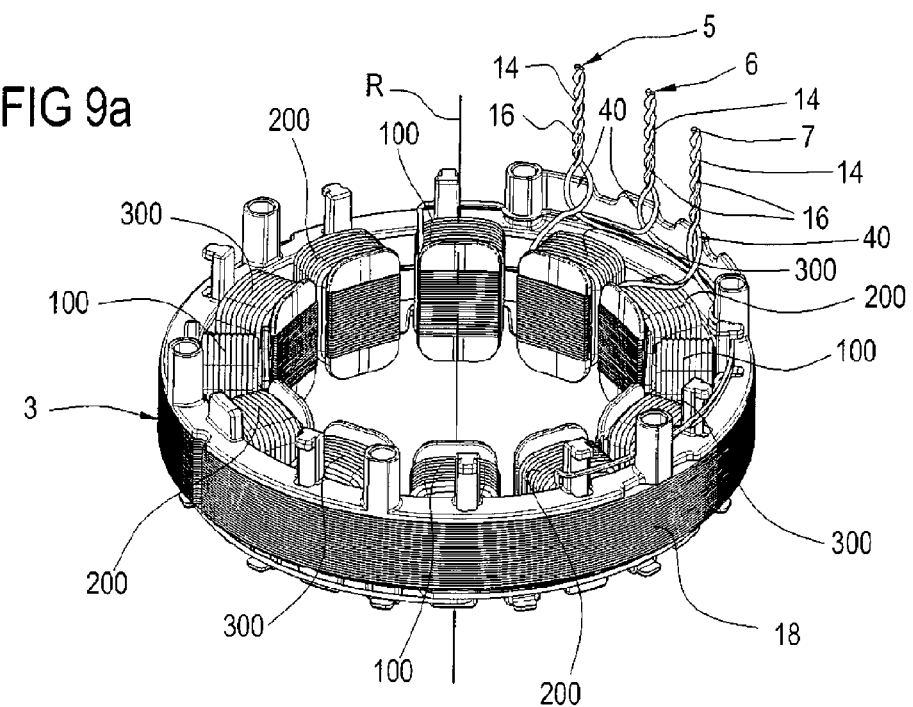
FIGS. 9a and 9b are, respectively, a perspective view and a plan view of the stator of the electric machine of FIG. 1, with some parts cut away in order to better illustrate others.
Figure 9B:
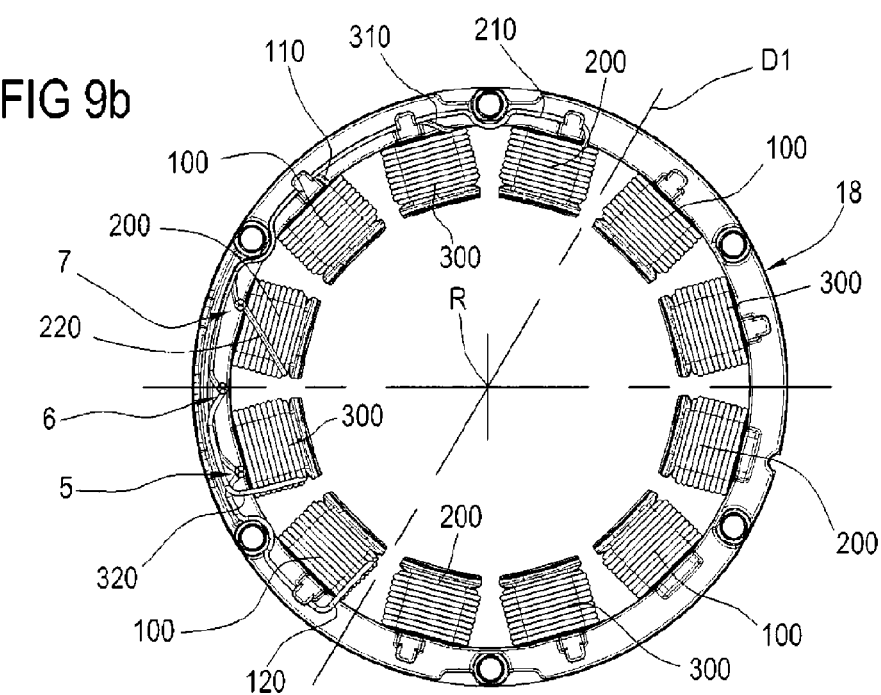

FIGS. 9a and 9b show the stator 3 after the electric terminations 5, 6, 7 have been made. These drawings show how the three electric terminations 5, 6, 7 extend away from the stator 3 along lines parallel to each other and parallel to the axis of rotation of the rotor 4. Each of the electric terminations 5, 6, 7 is formed by twisting round each other the two conductor wires the electric termination 5, 6, 7 consists of.

FIGS. 10a to 14 show successive operating steps during which the electric terminations 5, 6, 7 are made.

Figure 10B:
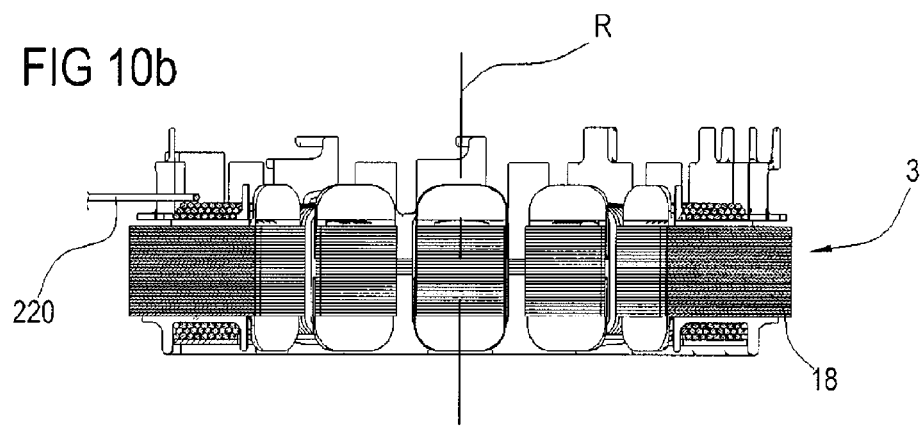
Figure 10A:
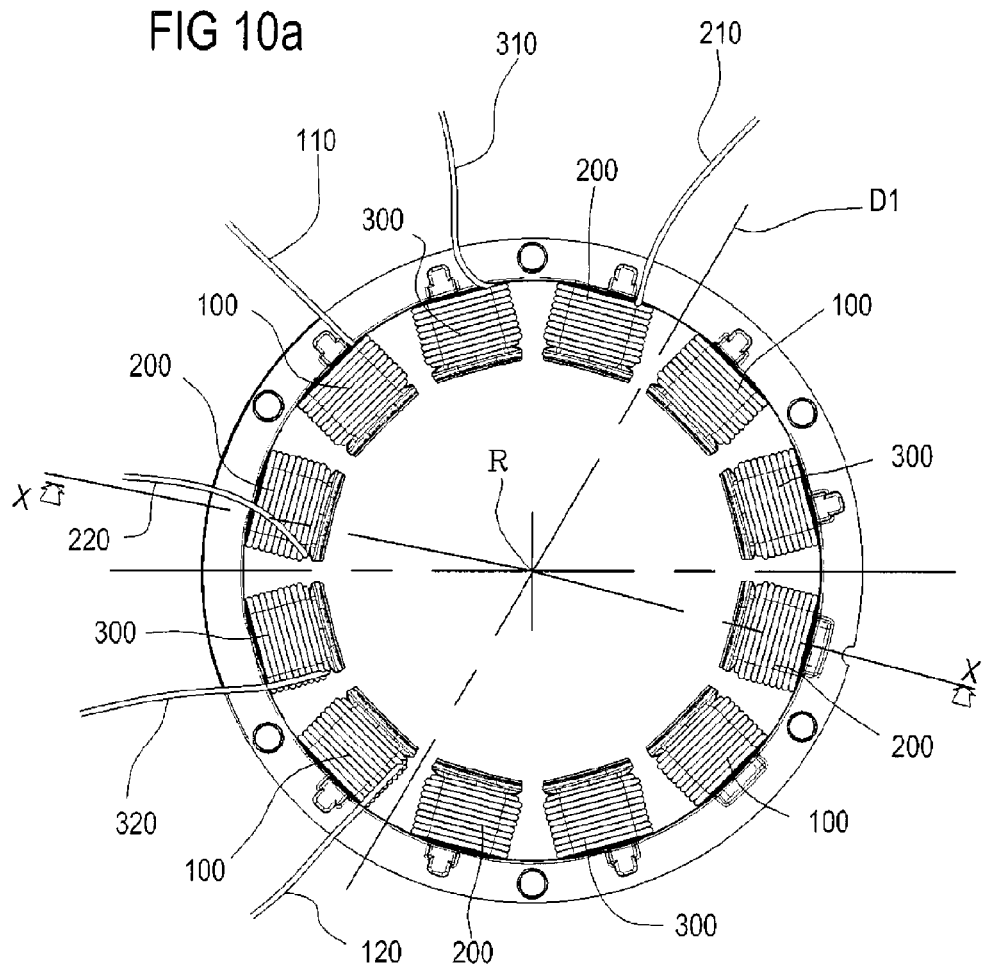
FIGS. 10a, 11a and 12a are three plan views of the stator of FIG. 9A illustrating three successive steps in its production.

FIGS. 10a and 10b illustrate the starting situation existing when the twisted electric terminations 5, 6, 7 are about to be made. These two drawings show the stator 3 in a configuration resulting from a preceding step of making the windings 100, 200, 300. More specifically, the drawings show six conductor wires 110, 120; 210, 220; 310, 320, forming, in pairs, the leads of the electric wire from which each group of windings 100, 200, 300 is made.

In FIGS. 10a and 10b, showing a 24 Volt electric motor (whereas in a 12 Volt motor, there would be twelve leads instead of six) the six conductor wires 110, 120; 210, 220; 310, 320 are arranged in a line substantially radial to the stator 3.

In other words, the six conductor wires 110, 120; 210, 220; 310, 320 are arranged in such a way that they lie in a first plane perpendicular to the axis R of rotation.

More specifically, the conductor wires 110, 120; 210, 220; 310, 320 are positioned according to a radial arrangement on half of the angular extension of the stator 3.

The conductor wires 110, 120; 210, 220; 310, 320 are positioned in a half-plane delimited by a diameter D1 and including the stator itself.

This half-plane corresponds to the half-plane in which the electric terminations 5, 6 and 7 are located, with reference in particular to FIG. 9b.

The length L of the conductor wires 110, 120; 210, 220; 310, 320 is between approximately 35 mm and approximately 185 mm so that, once suitably bent, they form the above mentioned leaf spring portion which allows the electric terminations 5, 6 and 7 to move as required.

The length of the conductor wires 110, 120; 210, 220; 310, 320 depends on the distance between the last coil of the winding 100, 200, 300 and, substantially, the position corresponding to the above mentioned tab 17.

Each conductor wire 110, 120; 210, 220; 310, 320 forms the leads of a respective group of windings 100; 200; 300 and must be connected to the electronic circuit 8, which is axially superposed on the stator 3, as shown in FIG. 5.

The stator 3 is positioned on a movable turret T which supports the stator 3 during the step of making the electric terminations 5, 6, 7, and preferably also during the preceding step of making the windings 100, 200, 300. Still more preferably, the turret T has two housing seats, each designed to accommodate a stator 3, and is rotatable about a horizontal axis located at an intermediate position between the two housing seats so as to allow the stator 3 being processed to be rapidly moved from the station where the windings 100, 200, 300 are made to the station where the electric terminations 5, 6, 7 are made.

Figure 11B:
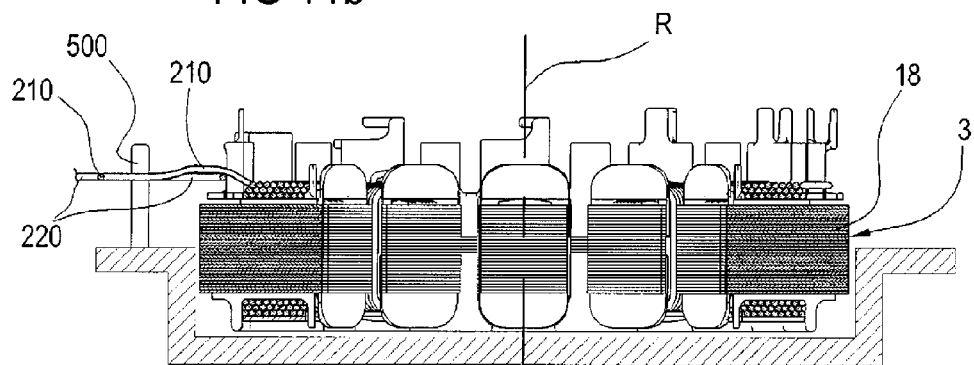
Figure 11A:
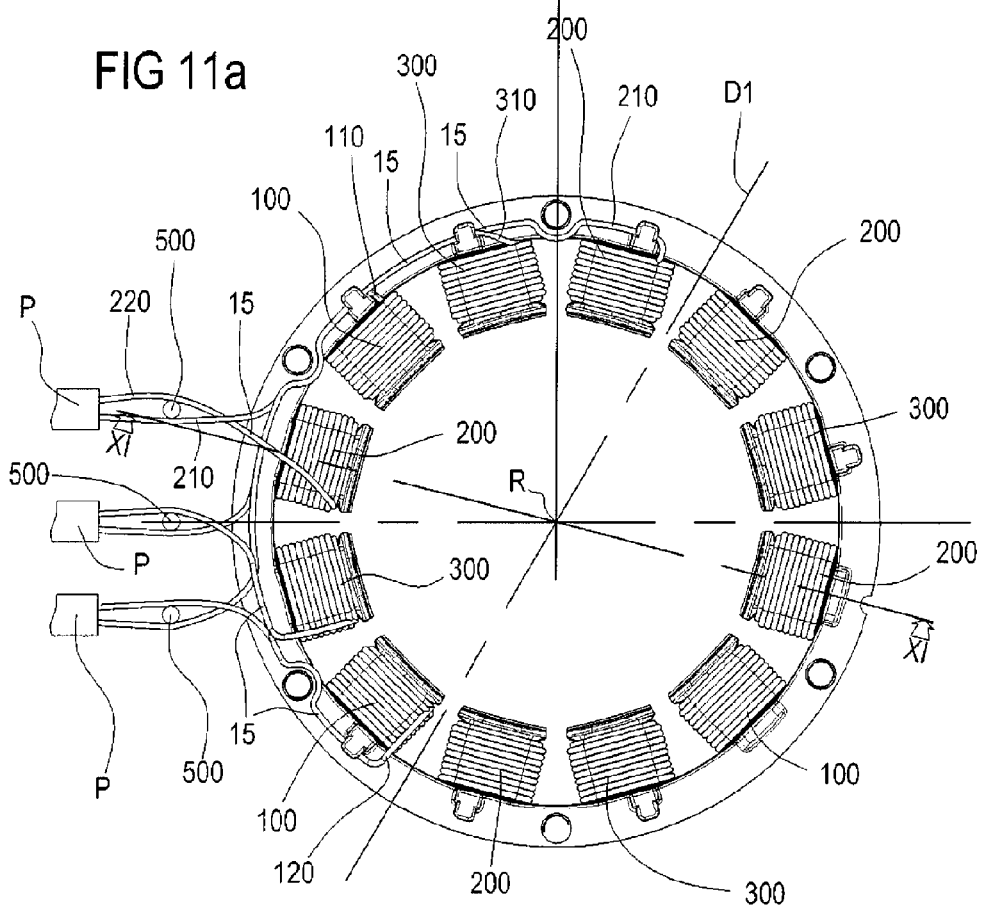
Figure 12B:
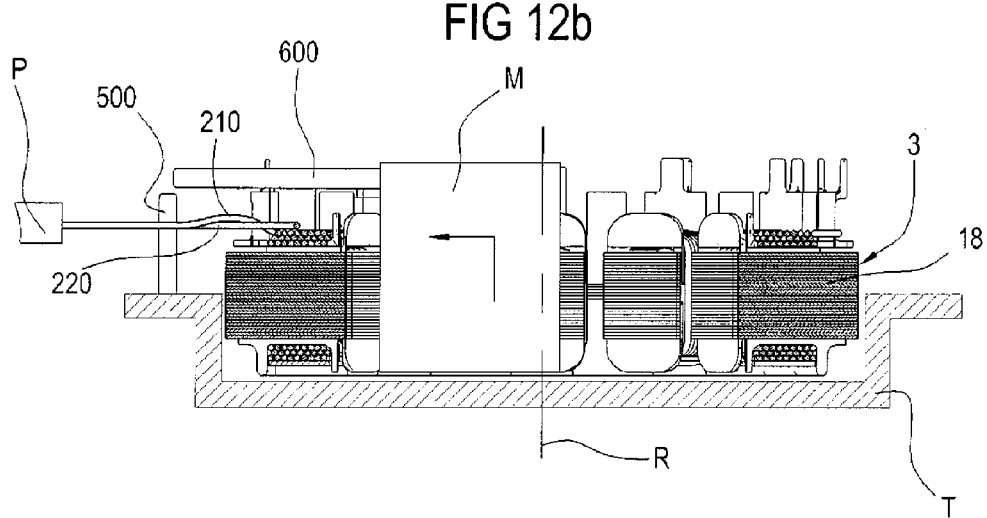
Figure 12A:
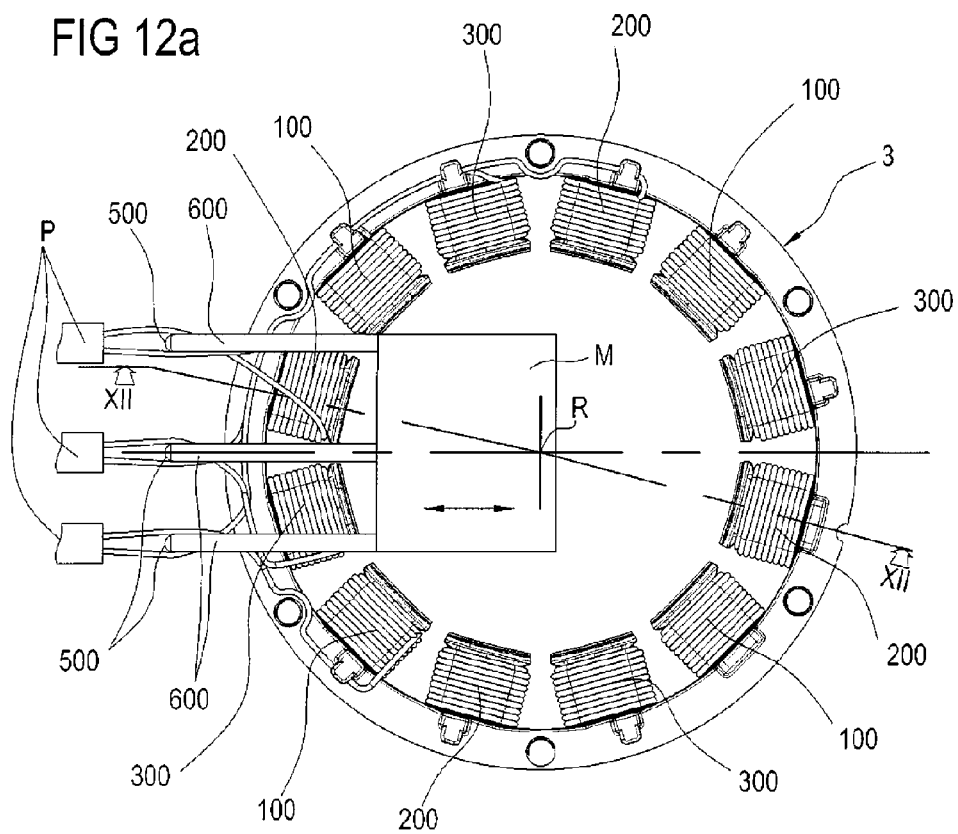

Starting from the configuration shown in FIG. 10a, a robot controlled arm, not illustrated, grips one after the other each of the radially arranged conductor wires 110, 120; 210, 220; 310, 320 and positions them in such a way that the free ends 14 of the conductor wires 110, 120; 210, 220; 310, 320 are placed at a predetermined angular position of the stator 3, as shown in FIG. 11a.

In this configuration, the leaf spring portions of each winding, that is to say, the legs 15, are formed.

The length L1 of the legs 15 is preferably between approximately 25 mm and approximately 60 mm in such a way as to follow the movements of the electronic circuit when the motor 1 is closed.

The length of the legs 15 depends on the distance between the last coil of the winding 100, 200, 300 and, substantially, the position corresponding to the above mentioned tab 17.

More specifically, the leads of the conductor wires 110, 120, 210, 220, 310, 320 are fitted securely in place using the gripper clamps P mounted on the turret T.

Further, the turret T comprises three pins 500, parallel to each other and extending along a line substantially parallel to the axis R of rotation. The function of the pins 500 is that of providing a locating reference for positioning the leads of the conductor wires 110, 120; 210, 220; 310, 320. Each pair of conductor wires 110, 120; 210, 220; 310, 320 is partially wound on a respective reference element or cylindrical pin 500 in such a way that the two wires of each pair cross each other around the pin 500 or in the vicinity of the pin 500, as shown in FIG. 11a. In this configuration, the conductor wires 110, 120; 210, 220; 310, 320 are arranged in such a way that they lie in a plane substantially perpendicular to the axis R of rotation.

Next, a mobile head M is fitted in the stator 3 along the axis R of rotation. The mobile head M is movable both along a line parallel to the axis R of rotation and along a line perpendicular to the axis R of rotation. In the latter of the two movements, the mobile head M can move close to the annular metal core of the stator 3.

The mobile head "M" has three parallel reference elements or teeth 600, each of which is designed to be superposed, preferably in contact or abutment with a respective pin 500 in such a way as to form, in conjunction with the pin 500 an L-shaped reference structure 500, 600.

Next, the robot-controlled arm (not illustrated) grips one after the other the pairs of conductor wires 110, 120; 210, 220; 310, 320 previously held by the gripper clamps P and bends the pair of conductor wires 110, 120; 210, 220; 310, 320 by pulling it until it lies in a plane parallel to the axis R of rotation, and hence perpendicular to the first plane.

That completes the formation of the legs 16 parallel to the axis R and at least partly forms the electric terminations 5, 6 and 7.

This movement thus causes each pair of conductor wires 110, 120; 210, 220; 310, 320 to bend by a right angle and during this movement the two conductor wires 110, 120; 210, 220; 310, 320 of each pair encircle first the respective pin 500 and then the respective tooth 600 of the mobile head M until the configuration illustrated in FIG. 13 is shown.

More in general, it is sufficient for the reference structure to extend along a generic profile having at least one change of direction to allow each pair of conductor wires 110, 120; 210, 220; 310, 320 to remain at least partly wound on the respective reference structure 500, 600 during the passage from the first plane to the second plane. The reference structure 500, 600 is preferably tubular in shape and, still more preferably, is delimited by two straight and cylindrical stretches 500, 600 to make it easier to pull the conductor wires 110, 120; 210, 220; 310, 320 on the reference structure 500, 600 itself during their passage from the first plane to the second plane.

Next, the robot-controlled arm grips the ends 14, placed side by side, of the conductor wires 110, 120; 210, 220; 310, 320 of each pair and turns them about an axis parallel to the axis R of rotation in such a way as to twist the two wires round each other to make the electric termination 5, 6, 7 shown in FIG. 9a.

More specifically, the twisted part of each electric termination 5, 6, 7 is formed only by the terminal portion 14a of the ends 14 which extends away from the reference structure 500, 600, and which forms the above mentioned second leg 16. The rest of each conductor wire 110, 120; 210, 220; 310, 320 positioned between the reference structure 500, 600 and the respective winding 100, 200, 300 does not undergo any twisting action.

It should be noted that, for each electric termination 5, 6, 7, an eye 40 is formed at the base of the twisted part substantially at the reference elements 600.

The eye 40 imparts to the electric termination 5, 6, 7 elasticity along the axis R.

In a preferred embodiment of the invention, the twisted portion of each electric termination 5, 6, 7 has a length of between 20 mm and 30 mm, preferably between 25 mm and 28 mm.

Preferably, the robot-controlled arm first positions all the conductor wires 110, 120; 210, 220; 310, 320 around the pins 500 and then proceeds with the other operations.

Preferably, furthermore, the step of bending the pair of conductor wires 110, 120; 210, 220; 310, 320 and the respective twisting step are performed one after the other without the robot-controlled arm releasing its grip on the wire pairs.

FIG. 14 clearly shows, as already mentioned, that the electric terminations 5, 6, 7 form the second leg 16 of the flexible portions 13, and are positioned above the respective tooth 600 of the mobile head M (which is subsequently retracted).

Advantageously, the second leg 16 of each electric termination comprises the corresponding eye 40.

Thus delineated under the tooth 600 is the first leg 15 of each flexible portion 13, this leg being raised with respect to the stator 3 and acting as a leaf spring (since it projects from the stator 3 in cantilever fashion).

A method for assembling the machine 1 comprises the steps of preparing the casing 2, placing the stator 3 with the respective electric terminations 5, 6, 7 in the casing 2, placing the rotor 4 in the casing 2, rotatably connecting it to the latter, and preparing the elastic elements 12 on the stator 3.

The mounting element 21, with the electronic circuit 8, is then placed on the elastic elements 12 in such a way that each of the ends 14 of the flexible portions 13 is located at the respective tab 17.

It should be noticed that at this stage the elastic elements 12 keep the electronic circuit 8 at a distance from the stator 3, further away from the stator than it is subsequently when the motor is closed.

Thus, once the motor 1 is closed, the elastic elements 12 push the electronic circuit 8 against the cover/heat sink 2a with the required force.

The ends 14 of the electric terminations 5, 6, 7 are then soldered to the respective tabs 17 to make a good, secure electrical contact between the two parts.

Next, the method comprises placing the cover 2a on the electronic circuit 8 and securing it to the casing 2.

At this stage, as mentioned above, the elastic elements 12 push the circuit 8 towards the cover 2a, while the soldered flexible portions 13 allow it to be moved towards the stator 3 without compromising the electrical connection. Advantageously, during this close-up movement, the twisted part of the flexible portions 13, that is to say, the electric terminations 5, 6, 7, do not tend to be deformed but, thanks to the twisted structure, maintains a straight configuration parallel to the axis of rotation R, while the first leg 15 of the flexible portions acts as a leaf spring and damps the force of the circuit 8 moving closer to the stator 3.

Similarly, as already mentioned, the eyes 40 also constitute a damping element of the twisted part.

The leaf-spring portions make it possible to compensate assembly "clearances" without creating stress on the material, above all, at the solders.

In practice, the motor can be assembled in the traditional manner until fitting the rotor and the related supports which are not described.

The elastic elements 12 are housed in the stator and when the electronic circuit is inserted keep the latter clear of the stator 3 and casing 2.

Advantageously, the ends 14 of the electric terminations 5, 6, 7 protrude from the mounting element 21 through suitably located respective holes 30 where the conductive tracks, on the side opposite the stator 3 with respect to the mounting element 21, are provided with the above mentioned tabs 17 to which the ends 14 of the electric terminations 5, 6, 7 are soldered.

The means 35 keep the ends 14 of the electric terminations 5, 6, 7 in a position suitable for insertion into the respective holes 30.

The mounting element 21 is preferably made of moulded plastic material and the conductive tracks of the electronic circuit 8 are buried in it, that is to say, the conductive tracks are formed at the same time as the mounting element 21 is moulded.

This invention achieves the preset aims and overcomes the above mentioned disadvantages of the prior art.

The twisted structure of the electric terminations allows the conductor wires to maintain the required orientation even when the electronic circuit and the stator move relative to each other during assembly of the electric machine. In effect, the twisted structure of the electric terminations has high flexural rigidity and means that the only parts of the conductor wires that can be deformed during assembly of the electric machine are the leaf springs transversal to the axis of rotation or even the eyes at the base of the twisted parts. It follows that the electric terminations remain in position and their electrical connection to the electronic circuit is secure and reliable.

Furthermore, the above advantage is all the more evident considering that the elastic elements cause the electronic circuit and stator to move considerably relative to each other during assembly. Such movements, however, do not reduce the security of the connections since the twisted electric terminations are rigid and resistant to the bending caused by the movements.

It should also be noted that the rigid connection, for example by soldering, between the stator and the electronic circuit offers a much better contact strength than prior art sliding contact solutions.

Moreover, the provision of the leaf-spring portions make the motor totally dependable in terms not only of heat absorption but also of electrical connections and related conductivity.

The solution is especially advantageous for sealed motors which, although they have no openings giving access inside, can be assembled in optimal manner.

The invention claimed is:

1. A stator for an electric machine, the stator comprising:
a core having a plurality of pole expansions and a plurality of windings made of electrically conductive material on the pole expansions, where at least a part of the windings is made from a conductor wire having a pair of free ends that can be connected electrically to a mains power supply; and
two or more electric terminations electrically connectable to respective electrical power supply terminals;
characterized in that at least one of the electric terminations is formed by two free ends of respective different conductor wires and has a twisted form created by twisting the ends along a principal line of extension of the ends, an eye being formed, for each electric termination, by the respective conductor wires at the base of the twisted part, the electric terminations also comprising a flexible portion which is movable towards the core and away from the core.

2. The stator according to claim 1, wherein the eye forms a damping element for the respective twisted portion.

3. The stator according to claim 1, wherein the flexible portions comprise a first leg substantially transversal to an axis (R) of rotation of the electric machine, the first leg forming a leaf spring suspension, and a second leg substantially parallel to the axis (R), the second leg comprising the eye.

4. The stator according to claim 1, characterized in that the twisted electric termination is positioned substantially in line with the axis (R) of rotation of the electric machine.

5. The stator according to claim 3, wherein the twisted portion of each electric termination is formed by a terminal portion of the free ends, the terminal portion forming the second leg.

6. The stator according to claim 1, wherein the twisted portion of each electric termination has a length of between 20 mm and 30 mm, preferably between 25 mm and 28 mm.

* * * * *